United States Patent
Su et al.

(10) Patent No.: US 9,954,644 B2
(45) Date of Patent: Apr. 24, 2018

(54) ETHERNET DATA PROCESSING METHOD, PHYSICAL LAYER CHIP AND ETHERNET EQUIPMENT

(71) Applicant: HUAWEI TECHNOLOGIES CO., LTD., Shenzhen, Guangdong (CN)

(72) Inventors: Wei Su, Amsterdam (NL); Li Zeng, Shenzhen (CN); Kai Cui, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 109 days.

(21) Appl. No.: 14/891,778

(22) PCT Filed: Jan. 4, 2013

(86) PCT No.: PCT/CN2013/070014
§ 371 (c)(1),
(2) Date: Nov. 17, 2015

(87) PCT Pub. No.: WO2014/106319
PCT Pub. Date: Jul. 10, 2014

(65) Prior Publication Data
US 2016/0094311 A1    Mar. 31, 2016

(51) Int. Cl.
*H04L 1/00* (2006.01)
*G06F 11/10* (2006.01)
(Continued)

(52) U.S. Cl.
CPC ............ *H04L 1/0041* (2013.01); *G06F 11/10* (2013.01); *H04L 1/0045* (2013.01);
(Continued)

(58) Field of Classification Search
CPC ..... H04L 1/0041; H04L 25/49; H04L 1/0057; H04L 25/14; H04L 1/0045; G06F 11/10
See application file for complete search history.

(56) References Cited

U.S. PATENT DOCUMENTS 8,176,201 B1    5/2012    Minei et al.
2008/0065794 A1*    3/2008    Lee .................. G06F 13/28
                                                    710/24
(Continued)

FOREIGN PATENT DOCUMENTS

CN    101192900 A    6/2008
CN    101345745 A    1/2009
(Continued)

OTHER PUBLICATIONS

Chinese Search Report dated Apr. 26, 2016 in corresponding Chinese Patent Application No. 2013800024353.
(Continued)

*Primary Examiner* — Thien Nguyen
(74) *Attorney, Agent, or Firm* — Staas & Halsey LLP

(57) ABSTRACT

Embodiments of the present invention disclose an Ethernet data processing method, an Ethernet physical layer chip, and Ethernet equipment. Applicable to data processing at a transmit end, the method includes: performing line coding on data from a media access control layer, so as to obtain serial data code blocks; performing forward error correction FEC coding on the serial data code blocks, so as to obtain FEC frames, which specifically includes: inserting Y check bits every X consecutive data bits, where the Y check bits are generated when FEC coding is performed on the X consecutive data bits; and distributing, at a distribution granularity of a bits, the FEC frames successively to N virtual channels, where a and N are both positive integers, and a is less than a quantity of bits included in one FEC frame.

11 Claims, 11 Drawing Sheets

(51) Int. Cl.
*H04L 25/14* (2006.01)
*H04L 25/49* (2006.01)
(52) U.S. Cl.
CPC ............ *H04L 1/0057* (2013.01); *H04L 25/14* (2013.01); *H04L 25/49* (2013.01)

(56) References Cited

U.S. PATENT DOCUMENTS

| | | | |
|---|---|---|---|
| 2008/0138075 A1 | 6/2008 | Gustlin et al. | |
| 2011/0044686 A1* | 2/2011 | Wu | H04J 3/1652 398/43 |
| 2011/0191656 A1* | 8/2011 | Bliss | H03M 13/05 714/776 |
| 2012/0155486 A1* | 6/2012 | Ahn | H04L 5/1423 370/433 |
| 2014/0177652 A1 | 6/2014 | Su et al. | |
| 2015/0012677 A1* | 1/2015 | Nagarajan | G06F 13/4022 710/106 |

FOREIGN PATENT DOCUMENTS

| | | |
|---|---|---|
| CN | 101888281 A | 11/2010 |
| CN | 102439995 A | 5/2012 |
| EP | 1033843 | 9/2000 |
| WO | 2012/103287 A1 | 8/2012 |

OTHER PUBLICATIONS

Chinese Office Action dated May 5, 2016 in corresponding Chinese Patent Application No. 201380002435.3.
Extended European Search Report dated Jul. 4, 2016 in corresponding European Patent Application No. 13870025.7.
International Search Report, dated Oct. 17, 2013, in corresponding International Application No. PCT/CN2013/070014 (4 pp.).
International Search Report dated Oct. 17, 2013 in corresponding International Patent Application No. PCT/CN2013/070014.
"IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Amendment 4: Media Access Control Parameters, Physical Layers, and Management Parameters for 40 Gb/s and 100 Gb/s Operation", IEEE Computer Society, Jun. 22, 2010, New York, New York, pp. 457.
European Office Action dated Apr. 12, 2017 in European Patent Application No. 13870025.7.

* cited by examiner

ETHERNET DATA PROCESSING METHOD, PHYSICAL LAYER CHIP AND ETHERNET EQUIPMENT

CROSS-REFERENCE TO RELATED APPLICATIONS

This application is a National Stage of International Application No. PCT/CN2013/070014, filed on Jan. 4, 2013, which is hereby incorporated by reference in its entirety.

TECHNICAL FIELD

The present invention relates to the field of network transmission, and in particular, to an Ethernet data processing method and an apparatus.

BACKGROUND

With development of technologies, Ethernet has developed from 10M Ethernet, 100M Ethernet, 1G Ethernet, and 10G Ethernet to 40G Ethernet and 100G Ethernet at present, and accordingly their rates also grow from 10 Mbit/s, 100 Mbit/s, 1 Gbit/s, and 10 Gbit/s to 40 Gbit/s and 100 Gbit/s at present. Currently, 40G Ethernet and 100G Ethernet have been widely adopted. However, rapidly emerging new services such as IP video and cloud computing drive service traffic to increase at a speed of 50%-60% every year. In the coming decade, service traffic will increase approximately 100 times and high bandwidth becomes an urgent need, which drives Ethernet to evolve to a higher rate. A rate of next generation Ethernet (collectively referred to as beyond-100G Ethernet in the present application) probably reaches 400 Gbit/s, 1 Tbit/s, or 1.6 Tbit/s. An Ethernet interface exceeding 100 Gbit/s is used between backbone routers, or between core switches, or between a backbone router and transmission equipment, or is used to interconnect cloud network data centers of an operator. This can effectively reduce costs.

As Ethernet rates increase, it is very difficult to provide a communication bandwidth exceeding 100 Gbit/s by increasing a transmission rate of a single channel. To achieve Ethernet rates exceeding 100 Gbit/s, a high order modulation method and multiple channels become available technologies. Using the high order modulation method can increase a transmission rate of a single channel as much as possible. In addition, multiple channels are used to perform concurrent transmission. Therefore, an overall transmission rate is increased. The increased transmission rate of a single channel and introduction of the high order modulation method result in a phenomenon of a large transmission loss and decreased receiver sensitivity, and therefore bit errors occur during line transmission. Therefore, for the beyond-100G Ethernet, an FEC (Forward Error Correction, forward error correction) function needs to be introduced to implement error-free transmission, and the introduced FEC function can provide a high coding gain and has a characteristic of small latency.

In existing 40G Ethernet and 100G Ethernet, the FEC function is introduced by adding an FEC sublayer to a physical-layer architecture. For the physical-layer architectures of 40G Ethernet and 100G Ethernet, refer to the standard IEEE 802.3ba. The physical-layer architecture includes the following sublayers: a PCS (Physical Coding Sublayer, physical coding sublayer), an FEC sublayer, a PMA (Physical Medium Attachment, physical medium attachment) sublayer, and a PMD (Physical Medium Dependent, physical medium dependent) sublayer. The following uses 100G Ethernet as an example to briefly describe a process related to FEC processing. In a sending direction, the PCS sublayer provides a 64B/66B code function and distributes 66B code blocks obtained by coding to 20 virtual channels; the FEC sublayer separately performs FEC processing based on the virtual channels, and separately performs FEC coding on the code blocks distributed to each virtual channel. Specifically, a Fire code (2112, 2080) is used to perform FEC coding. A synchronization header of each 66B code block is compressed to save 32-bit space for each 32 66B code blocks. The saved 32-bit space is used as a check area in which check information generated during an FEC coding process is filled. Processing of the PCS sublayer and FEC sublayer in a receiving direction is reverse to processing in the sending direction. For details, refer to the standard IEEE 802.3ba. The standard 802.3ba further indicates that a maximum coding gain provided in an FEC processing scheme based on the existing physical-layer architecture is only 2 dB and latency is 430 ns.

However, for the future beyond-100G Ethernet, the FEC processing scheme based on the existing physical-layer architecture cannot provide different coding gains according to different requirements due to a limitation of the maximum coding gain that can be provided in the scheme, and the latency introduced in the scheme is too large to meet a latency requirement of the beyond-100G Ethernet.

SUMMARY

In view of this, embodiments of the present invention provide an Ethernet data processing method, a physical layer chip, and Ethernet equipment.

A first aspect of the present invention provides an Ethernet data processing method, and the method is applicable to data processing at a transmit end and includes:

performing line coding on data from a media access control layer, so as to obtain serial data code blocks;

performing forward error correction FEC coding on the serial data code blocks, so as to obtain FEC frames, which specifically includes: inserting Y check bits every X consecutive data bits, where the Y check bits are generated when FEC coding is performed on the X consecutive data bits, and each of the FEC frames includes the X consecutive data bits and the Y check bits that are generated when FEC coding is performed on the X consecutive data bits, where X and Y are both positive integers; and distributing, at a distribution granularity of a bits, the FEC frames successively to N virtual channels, where a and N are both positive integers, and a is less than a quantity of bits included in each of the FEC frames.

With reference to the first aspect, in a first possible implementation manner of the first aspect, N is specifically a least common multiple of m and n, m is a quantity of electrical channels, at an Ethernet physical layer, connected to two adjacent physical medium attachment sublayers, and n is a quantity of optical channels at the Ethernet physical layer.

With reference to the first aspect or the first possible implementation manner of the first aspect, in a second possible implementation manner of the first aspect, each of the FEC frames further includes at least one FEC frame identifier field used for indicating a location of a check bit in the FEC frame.

With reference to the first aspect, or the first possible implementation manner of the first aspect, or the second possible implementation manner of the first aspect, in a third possible implementation manner of the first aspect, the distributing, at a distribution granularity of a bits, the FEC frames successively to N virtual channels specifically includes:

distributing, at the distribution granularity of a bits, Q FEC frames successively to the N virtual channels; and inserting, every (Q×(X+Y))/(N×a) of the distribution granularity, at least one alignment word into each virtual channel, where a value of Q enables data of the Q FEC frames to be evenly distributed to the N virtual channels, and the alignment word is used by a receive end to determine a boundary of an FEC frame.

With reference to the first aspect or any one of the first to the third possible implementation manners of the first aspect, in a fourth possible implementation manner of the first aspect, a is specifically equal to a positive integer multiple of a quantity of bits included in the data code blocks, or a is specifically equal to a positive integer multiple of a quantity of bits included in a code symbol of FEC coding.

With reference to the first aspect or any one of the first to the fourth possible implementation manners of the first aspect, in a fifth possible implementation manner of the first aspect, the Ethernet data processing method further includes: before the FEC frames are distributed, at the distribution granularity of a bits, successively to the N virtual channels, performing scrambling processing on the FEC frames.

With reference to any one of the first to the fifth possible implementation manners of the first aspect, in a sixth possible implementation manner of the first aspect, the Ethernet data processing method may further include: converting data from the N virtual channels into m pieces of data, and transmitting the m pieces of data over m electrical channels.

With reference to the sixth possible implementation manner of the first aspect, in a seventh possible implementation manner of the first aspect, the converting data from the N virtual channels into m pieces of data specifically includes:

if N is not equal to m, multiplexing data from N/m virtual channels into one piece of data by means of bit multiplexing or code block multiplexing. With reference to the sixth or seventh possible implementation manner of the first aspect, in an eighth possible implementation manner of the first aspect, the Ethernet data processing method may further include:

distributing the m pieces of data from the m electrical channels into n pieces of data in polling mode.

With reference to the eighth possible implementation manner of the first aspect, in a ninth possible implementation manner of the first aspect, the distributing the m pieces of data from the m electrical channels into n pieces of data in polling mode specifically includes:

distributing, by bits, the m pieces of data into n pieces of data in polling mode; or distributing, by code blocks, the m pieces of data into n pieces of data in polling mode.

With reference to the eighth or ninth possible implementation manner of the first aspect, in a tenth possible implementation manner of the first aspect, the Ethernet data processing method may further include:

separately modulating the n pieces of data onto n optical carriers, so as to obtain n optical signals, and transmitting the n optical signals to the receive end over the n optical channels.

A second aspect of the present invention provides an Ethernet data processing method, and the method is applicable to data processing at a receive end and includes:

adapting n pieces of data from a physical medium dependent sublayer to N virtual channels, where n and N are positive integers, and data adapted to each virtual channel includes a part of a same forward error correction FEC frame;

extracting FEC frames one by one from the data adapted to the N virtual channels, where each of the FEC frames includes X consecutive data bits and Y check bits, the Y check bits are generated when FEC coding is performed on the X consecutive data bits, and X and Y are both positive integers; and performing FEC decoding on the FEC frames, deleting check bits from the FEC frames, and restoring serial data code blocks.

With reference to the second aspect, in a first possible implementation manner of the second aspect, N is specifically a least common multiple of m and n, and m is a quantity of electrical channels, at an Ethernet physical layer, connected to two adjacent physical medium attachment sublayers.

With reference to the second aspect or the first possible implementation manner of the second aspect, in a second possible implementation manner of the second aspect, the extracting FEC frames one by one from the data adapted to the N virtual channels specifically includes:

performing block synchronization processing on the data adapted to the N virtual channels, so as to obtain N pieces of data whose blocks are synchronized;

locking an alignment word included in each piece of data whose blocks are synchronized;

performing, based on the locked alignment word, alignment and rearrangement processing on the N pieces of data whose blocks are synchronized; and determining a boundary of each of the FEC frames based on the locked alignment word, and then extracting the FEC frames one by one from the N pieces of data whose blocks are synchronized and that undergo alignment and rearrangement processing.

With reference to the second aspect, or the first possible implementation manner of the second aspect, or the second possible implementation manner of the second aspect, in a third possible implementation manner of the second aspect, before the adapting data from a physical medium dependent sublayer to N virtual channels, the Ethernet data processing method further includes:

separately performing demodulation on optical signals from n optical channels, so as to obtain the n pieces of data.

A third aspect of the present invention provides an Ethernet physical layer chip, including:

an encoder, configured to perform line coding on data from a media access control layer, so as to obtain serial data code blocks;

an FEC encoder, configured to perform FEC coding on the serial data code blocks, so as to obtain FEC frames, which specifically includes: inserting Y check bits every X consecutive data bits, where the Y check bits are generated when FEC coding is performed on the X consecutive data bits, and each of the FEC frames includes the X consecutive data bits and the Y check bits that are generated when FEC coding is performed on the X consecutive data bits, where X and Y are both positive integers; and a distribution module, configured to distribute, at a distribution granularity of a bits, the FEC frames successively to N virtual channels, where a and N are both positive integers, and a is less than a quantity of bits included in one FEC frame.

With reference to the third aspect, in a first possible implementation manner of the third aspect, N is specifically a least common multiple of m and n, m is a quantity of electrical channels, at an Ethernet physical layer, connected to two adjacent physical medium attachment sublayers, and n is a quantity of optical channels at the Ethernet physical layer.

With reference to the third aspect or the first possible implementation manner of the third aspect, in a second possible implementation manner of the third aspect, the FEC frame further includes at least one FEC frame identifier field used for indicating a location of a check bit in the FEC frame.

With reference to the third aspect, or the first possible implementation manner of the third aspect, or the second possible implementation manner of the third aspect, in a third possible implementation manner of the third aspect, the distribution module is specifically configured to:

distribute, at the distribution granularity of a bits, Q FEC frames successively to the N virtual channels; and insert, every $((Q \times (X+Y))/(N \times a))$ of the distribution granularity, at least one alignment word into each virtual channel, where a value of Q enables data of the Q FEC frames to be evenly distributed to the N virtual channels, and the alignment word is used by a receive end to determine a boundary of an FEC frame.

With reference to the third aspect or any one of the first to the third possible implementation manners of the third aspect, in a fourth possible implementation manner of the third aspect, a is specifically equal to a positive integer multiple of a quantity of bits included in the data code blocks, or a is specifically equal to a positive integer multiple of a quantity of bits included in a code symbol of FEC coding.

With reference to the third aspect or any one of the first to the fourth possible implementation manners of the third aspect, in a fifth possible implementation manner of the third aspect, the Ethernet physical layer chip further includes:

a scrambler, configured to: before the distribution module distributes the FEC frames successively to the N virtual channels, perform scrambling processing on the FEC frames, where accordingly the distribution module is specifically configured to distribute the FEC frames after scrambling processing, at the distribution granularity of a bits, successively to the N virtual channels.

With reference to the third aspect or any one of the first to the fifth possible implementation manners of the third aspect, in a sixth possible implementation manner of the third aspect, the Ethernet physical layer chip further includes:

an interface adaptation module, configured to convert data from the N virtual channels into m pieces of data.

With reference to the sixth possible implementation manner of the third aspect, in a seventh possible implementation manner of the third aspect, the interface adaptation module is specifically configured to: when N is not equal to m, multiplex data from N/m virtual channels into one piece of data by means of bit multiplexing or code block multiplexing.

A fourth aspect of the present invention provides an Ethernet physical layer chip, including:

an interface adaptation module, configured to adapt n pieces of data from a physical medium dependent sublayer to N virtual channels, where n and N are positive integers, and data adapted to each virtual channel includes a part of a same forward error correction FEC frame;

an FEC frame restoration module, configured to extract FEC frames one by one from the data adapted to the N virtual channels, where each of the FEC frames includes X consecutive data bits and Y check bits, the Y check bits are generated when FEC coding is performed on the X consecutive data bits, and X and Y are both positive integers; and an FEC decoder, configured to perform FEC decoding on the FEC frames, delete check bits from the FEC frames, and restore serial data code blocks.

With reference to the fourth aspect, in a first possible implementation manner of the fourth aspect, N is specifically a least common multiple of m and n, and m is a quantity of electrical channels, at an Ethernet physical layer, connected to two adjacent physical medium attachment sublayers.

With reference to the fourth aspect or the first possible implementation manner of the fourth aspect, in a second possible implementation manner of the fourth aspect, the FEC frame restoration module includes:

a block synchronization submodule, configured to perform block synchronization processing on the data adapted to the N virtual channels, so as to obtain N pieces of data whose blocks are synchronized;

an alignment word locking submodule, configured to lock an alignment word included in each piece of data whose blocks are synchronized;

an alignment and rearrangement submodule, configured to perform, based on the locked alignment word, alignment and rearrangement processing on the N pieces of data whose blocks are synchronized; and a frame extraction submodule, configured to determine a boundary of the FEC frame based on the locked alignment word, and then extract the FEC frames one by one from the N pieces of data whose blocks are synchronized and that undergo alignment and rearrangement processing.

With reference to the fourth aspect, or the first possible implementation manner of the fourth aspect, or the second possible implementation manner of the fourth aspect, in a third possible implementation manner of the fourth aspect, the FEC frame restoration module further includes:

a descrambler, configured to perform, before the frame restoration submodule, descrambling processing on the N pieces of data whose blocks are synchronized and that undergo alignment and rearrangement processing, where accordingly the frame extraction submodule is specifically configured to extract the FEC frames one by one from data output by the descrambler.

With reference to the fourth aspect or any one of the first to the third possible implementation manners of the fourth aspect, in a fourth possible implementation manner of the fourth aspect, the Ethernet physical layer chip further includes:

a decoder, configured to perform line decoding on the serial data blocks output by the FEC decoder.

A fifth aspect of the present invention provides Ethernet equipment, including:

a media access control layer chip, an optical module, the Ethernet physical layer chip according to the third aspect of the present invention or any one possible implementation manner of the third aspect, and m electrical channels that connect the Ethernet physical layer chip and the optical module; where the physical layer chip, configured to: perform line coding on data from the media access control layer chip, so as to obtain serial data code blocks; perform FEC coding on the serial data code blocks, so as to obtain FEC frames, which specifically includes: inserting Y check bits every X consecutive data bits, where the Y check bits are generated when FEC coding is performed on the X consecutive data bits; distribute, at a distribution granularity of a bits, the FEC frames successively to N virtual channels; and adapt data from the N virtual channels to the m electrical channels; where each of the FEC frames includes the X consecutive data bits and the Y check bits that are generated when FEC coding is performed on the X consecutive data bits, a, N, X, and Y are all positive integers, and a is less than a quantity of bits included in one FEC frame; and the optical module is configured to: convert the data input over the m electrical channels into n pieces of data; separately modulate the n pieces of data onto n optical carriers, so as to obtain n optical signals; and separately transmit the n optical signals to n optical channels; where m and n are both positive integers.

A sixth aspect of the present invention provides Ethernet equipment, including:

a media access control layer chip, an optical module, the Ethernet physical layer chip according to the fourth aspect of the present invention or any one possible implementation manner of the fourth aspect, and m electrical channels that connect the Ethernet physical layer chip and the optical module; where the optical module is configured to: receive n optical signals transmitted over n optical channels; obtain n pieces of data by performing demodulation on the n optical signals; convert the n pieces of data into m pieces of data; and transmit the m pieces of data to the Ethernet physical layer chip over the m electrical channels; where m and n are both positive integers; and the Ethernet physical layer chip is configured to: receive the m pieces of data transmitted over the m electrical channels; adapt the m pieces of data to N virtual channels; extract FEC frames one by one from the data adapted to the N virtual channels; perform FEC decoding on the FEC frames, delete check bits from the FEC frames, and restore serial data code blocks; and perform line decoding on the serial data code blocks and transmit the serial data code blocks to the media access control layer chip; where data adapted to each virtual channel includes a part of a same FEC frame, each of the FEC frames includes X consecutive data bits and Y check bits that are generated when FEC coding is performed on the X consecutive data bits, and N, X, and Y are all positive integers.

In the embodiments of the present invention, Y check bits are inserted every X consecutive data bits during FEC coding, and a value of Y may be set according to different requirements. Therefore, FEC coding in the embodiments of the present invention can provide different FEC coding gains according to different requirements. In addition, in the embodiments of the present invention, FEC coding is first performed, and then FEC frames obtained by coding are distributed, at a distribution granularity of a bits, successively to virtual channels, where a is less than a quantity of bits included in one FEC frame. Therefore, latency introduced during FEC decoding at a receive end is very small.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To facilitate understanding and realization of the present invention by a person skilled in the art, the following illustrates embodiments of the present invention with the help of accompanying drawings. Herein, the exemplary embodiments of the present invention and the descriptions thereof are used to explain the present invention, but are not intended to limit the present invention.

The following describes the technical solutions of the present invention with the help of the accompanying drawings and the embodiments.

Figure 1:
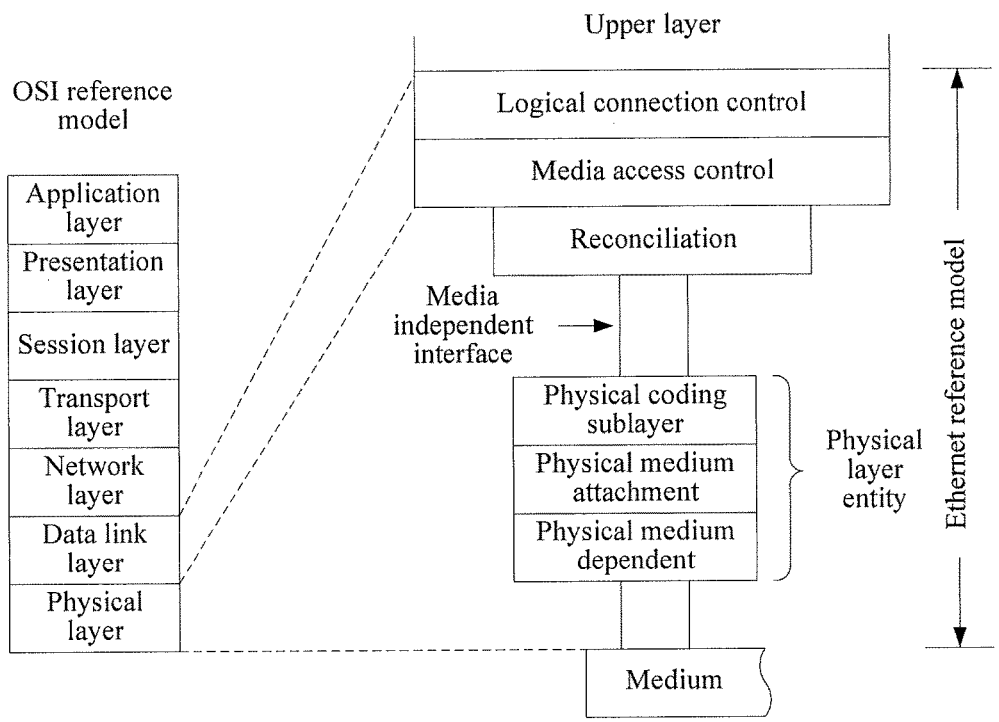
FIG. 1 is a schematic diagram of an Ethernet reference model according to an embodiment of the present invention.

10M Ethernet to existing 100G Ethernet have a similar architecture model. As shown in FIG. 1, the architecture model divided by layer includes: an LLC (Logic Link Control, logical link control) layer, a MAC (Media Access Control, media access control) layer, a reconciliation sublayer (Reconciliation Sublayer), and a PHY (Physical Layer Entity, physical layer entity), where the PHY includes: a PCS, a PMA sublayer, and a PMD sublayer. The LLC layer and the MAC layer are located at a data link layer of an OSI (Open System Interconnection, open systems interconnection) reference model. The reconciliation sublayer and the PHY are located at a physical layer of the OSI reference model. In another embodiment, there may also be a MAC control (MAC Control) layer between the LLC layer and the MAC layer. For functions of the LLC layer, the MAC layer, and the MAC control layer, refer to related specifications in the standard IEEE 802.3. Details are not described in this application. The structure shown in FIG. 1 is also used as an architecture of beyond-100G Ethernet applied in the embodiments of the present invention.

Figure 2:
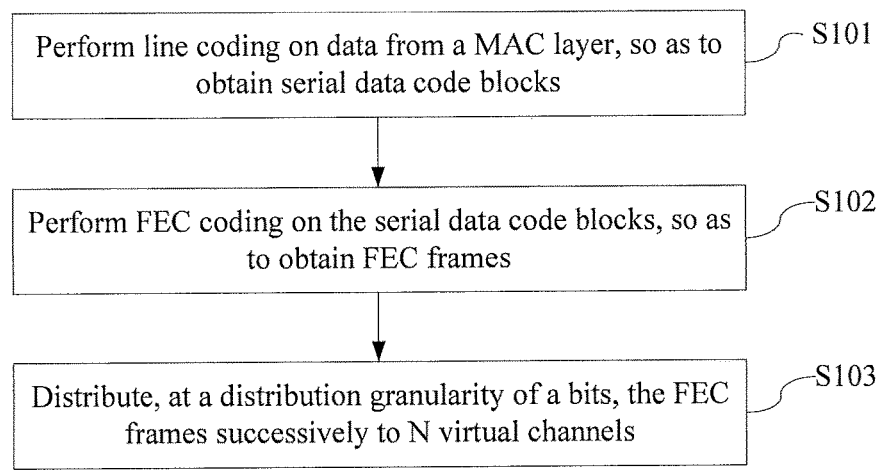
FIG. 2 is a flowchart of an Ethernet data processing method according to an embodiment of the present invention.

An embodiment of the present invention provides an Ethernet data processing method, which is mainly executed by a PHY of beyond-100G Ethernet and applicable to data processing at a transmit end. For a processing process, refer to FIG. 2. The method includes:

Step S101: Perform line coding on data from a MAC layer, so as to obtain serial data code blocks.

Line coding in this step functions in a same or similar way as coding at a PCS in existing 40G Ethernet and 100G Ethernet. Both of them can improve characteristics of cross-link information transmission. In this embodiment, line coding may specifically use, but is not limited to a 64B/66B code, a 256B/257B code, or a 512B/513B code, where "B" in the "64B/66B code", the "256B/257B code", and the "512B/513B code" refers to a bit (bit). After line coding, the data from the MAC layer becomes serially arranged data code blocks, where the data code blocks all have a same size and the size is determined by a code used in line coding. For example, if line coding uses the 64B/66B code, a size of a data code block obtained by coding is 66 bits, and the data code block may also be referred to as a 66B code block.

In this embodiment, a reconciliation sublayer converts serial data from the MAC layer into parallel data that is suitable for transmission at a physical layer, and sends the parallel data to a PCS by using an MII (Media Independent Interface, media independent interface). The PCS performs line coding on the data transmitted from the MII The MII is a logical interface between the reconciliation sublayer and the PCS. The MII in this embodiment of the present invention is specifically an MII in beyond-100G Ethernet. For example, the MII is specifically a CDGMII (400 Gigabit Media Independent Interface, 400 Gigabit media independent interface) for 400G Ethernet, where "CD" in "CDGMII" is 400 in roman numerals.

Step S102: Perform FEC coding on the serial data code blocks, so as to obtain FEC frames, which specifically includes: inserting Y check bits every X consecutive data bits, where the Y check bits are generated when FEC coding is performed on the X consecutive data bits, each of the FEC frames includes the X consecutive data bits and the Y check bits that are generated when FEC coding is performed on the X consecutive data bits, and X and Y are both positive integers.

A code block is a logical concept and may be considered as a series of consecutive bits that are processed as a whole. In this embodiment of the present invention, the serial data code blocks are actually a series of consecutive data bits. An FEC encoder encodes the serial data code blocks, that is, performs FEC coding on the series of consecutive data bits. Inserting check bits into input data bits, where the check bits are generated when FEC coding is performed on the input data bits is specifically: inserting Y check bits every X consecutive data bits, where the Y check bits are generated when FEC coding is performed on the X consecutive data bits, and one FEC frame includes the X consecutive data bits and the Y check bits that are generated when FEC coding is performed on the X consecutive data bits.

In this embodiment of the present invention, FEC coding may specifically use an RS (Reed-Solomon, Reed-Solomon) code, such as an RS (528, 514, t=7, m=10) code, and an RS (255, 239, t=8, m=8) code. Alternatively, FEC coding may use another type of code, which is not limited in the present application. An RS (528, 514, t=7, m=10) code is used as an example for brief description. In FEC coding, 514 10-bit code symbols are encoded into one frame including 528 code symbols, where "m=10" indicates that a size of a code symbol is 10 bits, and "t=7" indicates that a maximum length of consecutive errors that can be corrected by coding is a size of seven code symbols (that is, 70 bits). When FEC coding in this embodiment of the present invention uses the RS (528, 514, t=7, m=10) code, X is 5140 and Y is 140.

Step S103: Distribute, at a distribution granularity of a bits, the FEC frames successively to N virtual channels, where a and N are both positive integers, and a is less than a quantity of bits included in each of the FEC frames.

Figure 3:
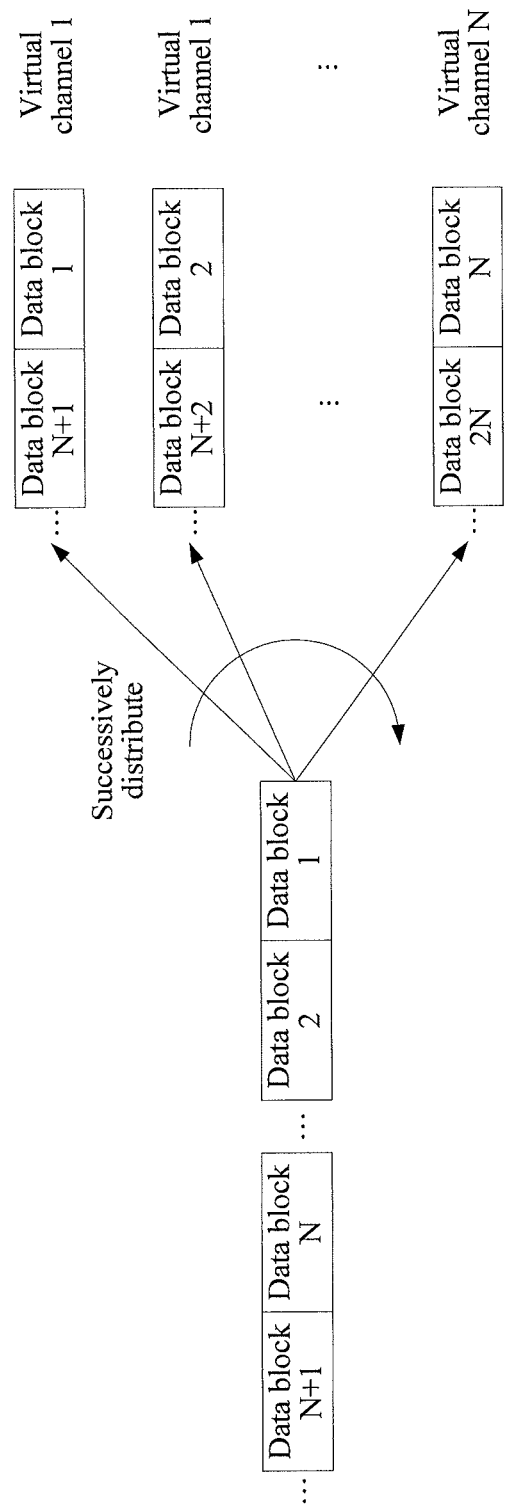
FIG. 3 is a schematic diagram of successive distribution according to an embodiment of the present invention.

A process of distributing, at a distribution granularity of a bits, the FEC frames successively to N virtual channels, as shown in FIG. 3, may specifically be understood as: the FEC frames are regarded as a series of data blocks whose size is a bits each, and then the data blocks are distributed one by one to the N virtual channels in a sequence. For example, a data block 1 is distributed to a virtual channel 1, a data block 2 is distributed to a virtual channel 2, and so on, and a data block N is distributed to a virtual channel N. Then, a data block N+1 is distributed to the virtual channel 1. The process cyclically continues.

In one embodiment, preferably, a is specifically equal to a positive integer multiple of a quantity of bits included in the data code blocks in Step S101, or a is equal to a positive integer multiple of a quantity of bits included in a code symbol of FEC coding in Step S102. In this embodiment, because a is equal to a positive integer multiple of the quantity of bits included in the data code blocks, or a is equal to a positive integer multiple of the quantity of bits included in the code symbol of FEC coding, the distribution granularity is one or a plurality of data code blocks or code symbols. Integrity of the data code blocks or code symbols is maintained when data is distributed by using the distribution granularity, so that when consecutive errors occur, the errors are unlikely to spread during FEC decoding or line decoding, thereby decreasing difficulty in error correction at a receive end and improving an error correction capability.

A value of an FEC coding gain depends on a size of space in which check information is filled. More space in which the check information is filled indicates a larger FEC coding gain, and less space in which the check information is filled indicates a smaller FEC coding gain.

In an FEC coding scheme of the existing 100G Ethernet, a synchronization header of each 66B code block is compressed to save 32-bit space for each 32 66B code blocks. Check information generated during FEC coding is filled in the saved 32-bit space. Each 66B code block includes 64-bit data and a 2-bit synchronization header. The synchronization header is a basis for performing block synchronization processing at the receive end. At least 1 bit needs to be reserved in a synchronization header of each 66B code block, that is, each 32 66B code blocks can provide a maximum of 32-bit space and the check information can be filled in the space in the FEC coding scheme of the existing 100G Ethernet. Therefore, a maximum coding gain provided in the FEC processing scheme of the existing 100G Ethernet is very limited.

In this embodiment of the present invention, space in which check information is filled is not provided in a manner of saving space by compressing a synchronization header of a data code block, but space in which check information is filled is provided in a manner of directly inserting check bits. Therefore, only by setting different quantities of check bits are set according to different requirements, the FEC coding scheme in this embodiment of the present invention can provide different FEC coding gains to meet different application requirements. When beyond-100G Ethernet is implemented, a multi-channel technology needs to be used. Multiple multi-channel schemes may be used when beyond-100G Ethernet at a same rate is implemented, where the multi-channel schemes have different requirements on an FEC coding gain. However, a quantity of check bits can be adjusted to provide different coding gains in this embodiment of the present invention. This flexibly meets coding gain requirements of various multi-channel technology implementation schemes.

In the existing 100G Ethernet, 66B code blocks obtained by coding at the PCS need to be first distributed to 20 virtual channels, and then FEC coding is separately performed on 66B code blocks distributed to each virtual channel, which means that FEC decoding can be performed only when data of a complete FEC frame is temporarily stored for each of the 20 virtual channels at the receive end, and the 20 virtual channels are parallel. In other words, the receive end needs to temporarily store data of at least 20 FEC frames to restore one FEC frame. Therefore, there is large latency. However, in this embodiment of the present invention, FEC coding is first performed on the serial data code blocks obtained by line coding, and then the FEC frames obtained by FEC coding are successively distributed to the N virtual channels. In this manner, FEC decoding can be performed as long as data temporarily stored for the N virtual channels jointly at the receive end is exactly data of one FEC frame, without the need to temporarily store data of a complete FEC frame for each virtual channel. Therefore, latency is greatly decreased.

In one embodiment, N is specifically a least common multiple of m and n, m is a quantity of electrical channels, at an Ethernet physical layer, connected to two adjacent physical medium attachment sublayers, and n is a quantity of optical channels at the Ethernet physical layer.

Figure 4:
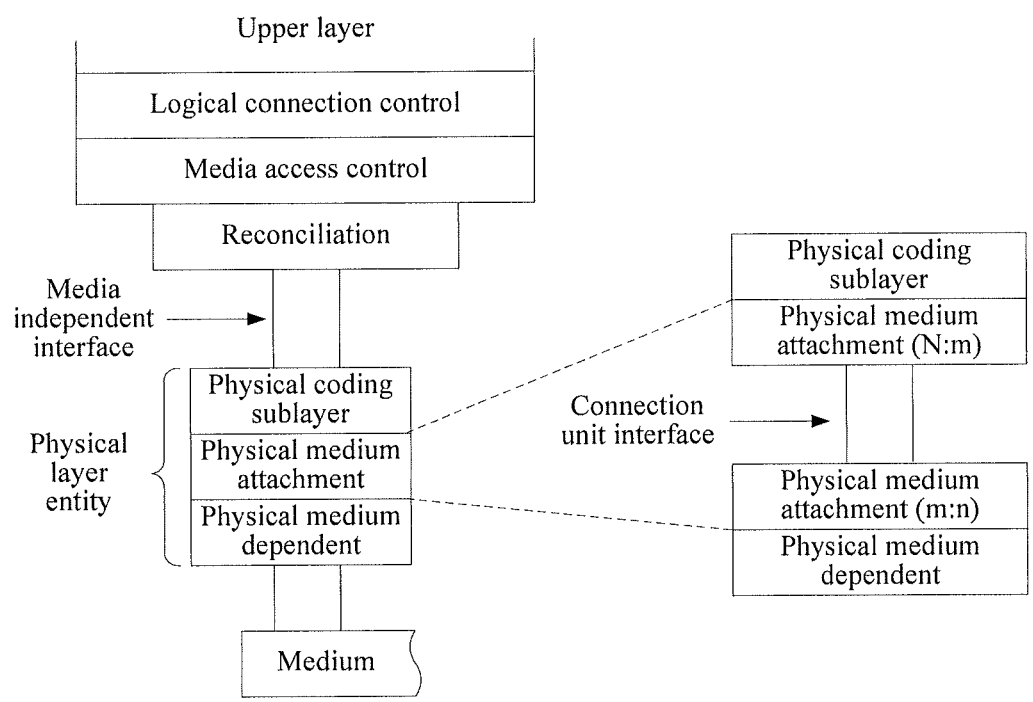
FIG. 4 is a schematic diagram of a structure of a physical medium attachment sublayer according to an embodiment of the present invention.

As shown in FIG. 4, a PMA sublayer is located between a PCS and a PMD sublayer. A function of the PMA sublayer provides an adaptation function between the PCS and the PMD sublayer: adapting data from each virtual channel at the PCS to a channel at the PMD sublayer, and adapting data from each channel at the PMD sublayer to each virtual channel at the PCS. Generally, one pair of mutually matched PMA sublayers provides the adaptation function and the pair of PMA sublayers are connected by using an AUI (Attachment Unit Interface, attachment unit interface). In this embodiment of the present invention, the electrical channels that are connected to two adjacent physical medium attachment sublayers are channels that form the AUI. A quantity of the electrical channels is a quantity of channels that form the AUI. An optical channel at the Ethernet physical layer is a channel used for transmitting a signal output by the PMD sublayer in a sending direction. A quantity of optical channels at the Ethernet physical layer is a quantity of channels used for transmitting a signal output by the PMD sublayer in the sending direction.

In one embodiment, a FEC frame formed after FEC coding processing further includes at least one FEC frame identifier field used for indicating a location of a check bit in the FEC frame, so that the receive end can determine the location of the check bit in the FEC frame according to the FEC frame identifier field.

In another embodiment, step S103 specifically includes:
distributing, at the distribution granularity of a bits, Q FEC frames successively to the N virtual channels; and inserting, every $(Q\times(X+Y))/(N\times a)$ of the distribution granularity, at least one alignment word into each virtual channel, where a value of Q enables data of the Q FEC frames to be evenly distributed to the N virtual channels.

In this embodiment of the present invention, the alignment word inserted into each virtual channel may include a field used for indicating a virtual channel number, or may be a filling pattern, where each pattern corresponds to a virtual channel number. At the receive end, the virtual channel number is identified based on the alignment word and a latency deviation between the N virtual channels is eliminated. In addition, the receive end may determine a boundary of an FEC frame according to the alignment word inserted into each virtual channel in this embodiment of the present invention. Because the data of the Q FEC frames is evenly distributed to the N virtual channels, and the at least one alignment word is inserted, every $(Q\times(X+Y))/(N\times a)$ of the distribution granularity, into each virtual channel, the first distribution granularity of one FEC frame definitely is closely adjacent to an alignment word of one of the virtual channels. Therefore, the receive end may determine the boundary of the FEC frame according to this rule.

Figure 5:
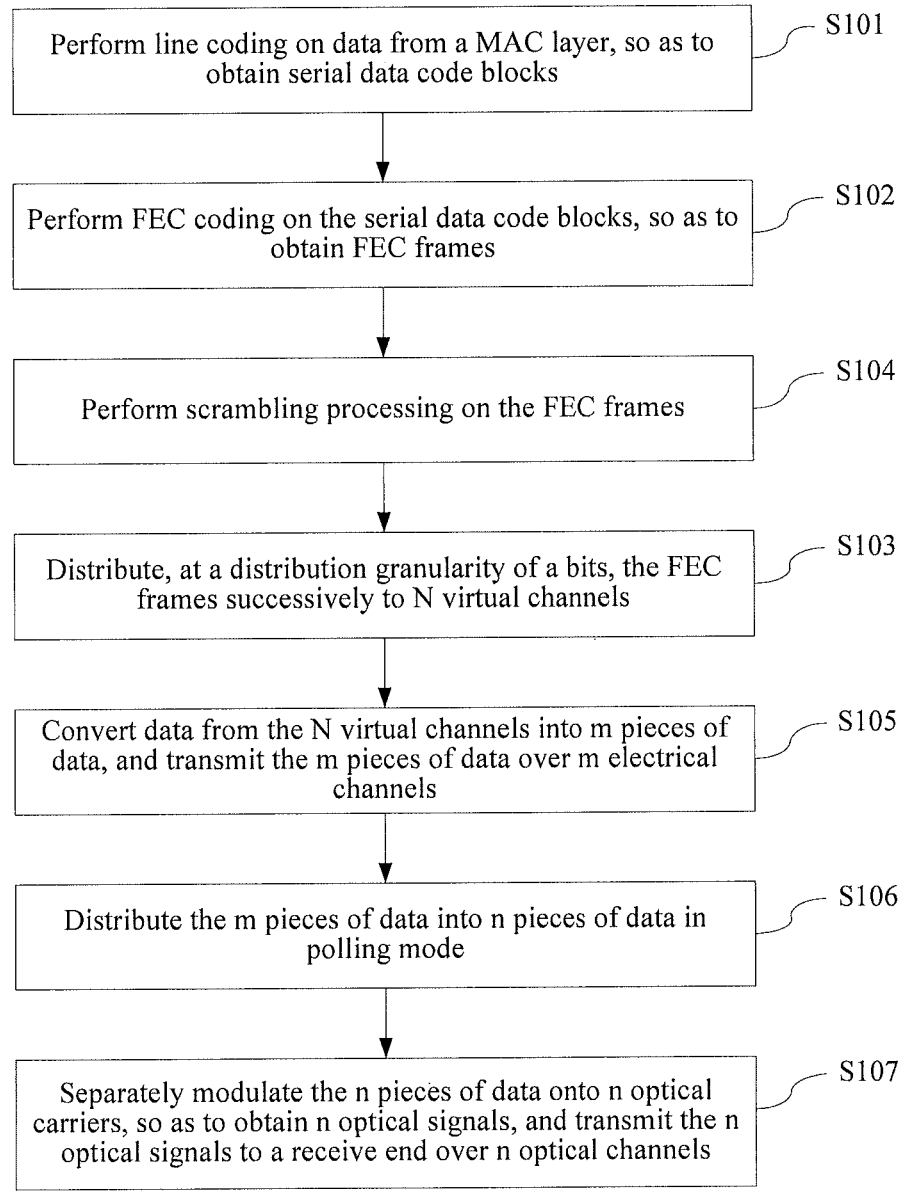
FIG. 5 is a flowchart of an Ethernet data processing method according to another embodiment of the present invention.

In another embodiment, as shown in FIG. 5, before step S103, the Ethernet data processing method further includes:
Step S104: Perform scrambling processing on the FEC frames. Accordingly, the FEC frames that are successively distributed in step S103 are specifically FEC frames after scrambling processing.

In this embodiment, a scrambling polynomial used in scrambling processing may specifically be, but is not limited to $1+b^{38}+b^{47}$, where b indicates data that is input into a scrambler to perform scrambling processing.

In this embodiment, scrambling processing may enable the receive end to restore a clock signal from received data more easily.

In this embodiment, as shown in FIG. 5, the Ethernet data processing method may further include:
Step S105: Convert data from the N virtual channels into m pieces of data, and transmit the m pieces of data over m electrical channels.

In one specific embodiment, step S105 may be specifically:
if N is not equal to m, multiplexing data from N/m virtual channels into one piece of data by means of bit multiplexing or code block multiplexing; or
if N is equal to m, transmitting the m pieces of data over the m electrical channels.

In this embodiment, code block multiplexing and bit multiplexing are similar, and the only difference is: Code block multiplexing is performed on a code block basis, while bit multiplexing is performed on a bit basis. In the case of code block multiplexing, preferably, a size of a code block is the same as a size of a code symbol in FEC coding, or is the same as a size of a distribution granularity.

In this embodiment, as shown in FIG. 5, the Ethernet data processing method may further include:
Step S106: Distribute the m pieces of data into n pieces of data in polling mode.

In one specific embodiment, step S106 specifically includes:
distributing, by bits or code blocks, the m pieces of data into n pieces of data in polling mode.

Poll distribution by bits is a prior art. For details, refer to related processing in the existing 100G Ethernet.

In this embodiment, as shown in FIG. 5, the Ethernet data processing method may further include:
Step S107: Separately modulate the n pieces of data onto n optical carriers, so as to obtain n optical signals, and transmit the n optical signals to the receive end over the n optical channels.

Figure 6:
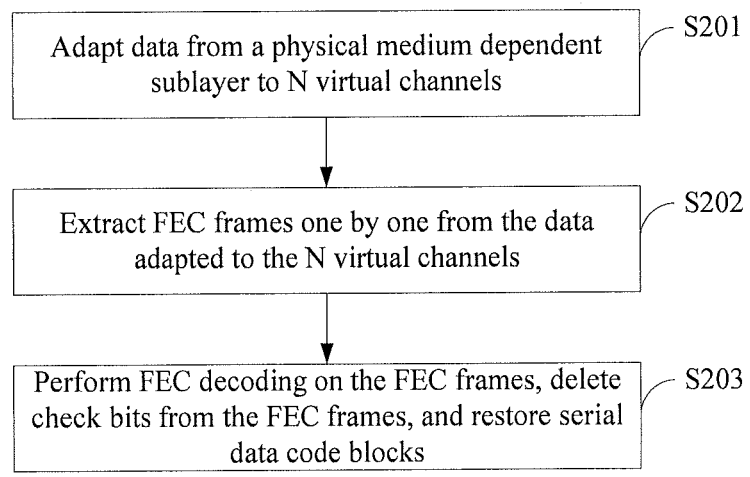
FIG. 6 is a flowchart of an Ethernet data processing method according to an embodiment of the present invention.
Figure 7:
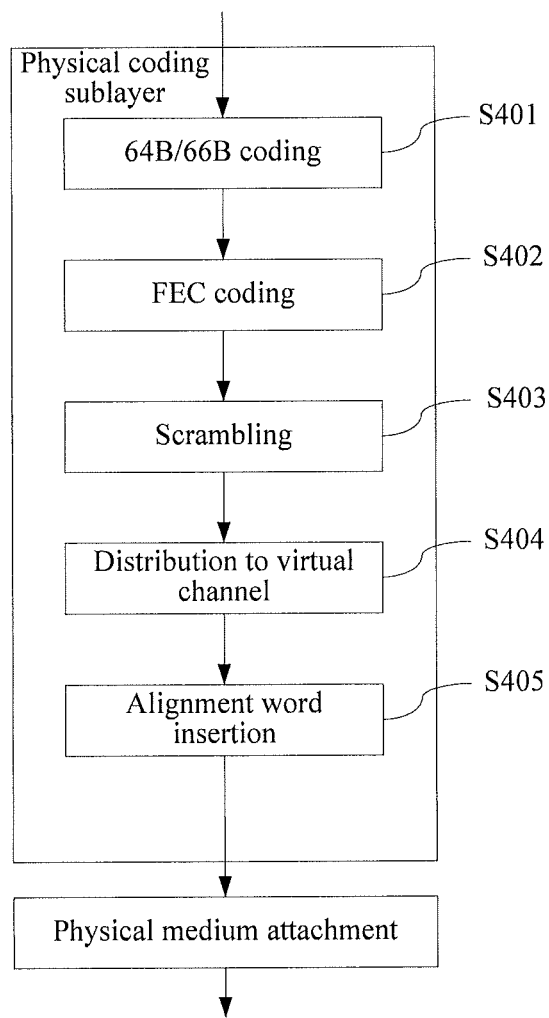
FIG. 7 is a flowchart of an Ethernet data processing method according to another embodiment of the present invention.

Corresponding to the Ethernet data processing method that is provided in the foregoing embodiment and is executed at a transmit end, an embodiment of the present invention further provides an Ethernet data processing method, which is mainly executed by a PHY of beyond-100G Ethernet and applicable to data processing at a receive end. For a processing process, refer to FIG. 6. The method includes:

Step S201: Adapt n pieces of data from a PMD sublayer to N virtual channels.

In this embodiment, N is a positive integer. It can be learned from the foregoing embodiment that FEC frames are successively distributed one by one to N virtual channels at a transmit end. Therefore, data adapted to each virtual channel includes a part of a same FEC frame in this step.

In this embodiment, the receive end receives n optical signals transmitted over n optical channels. The n optical signals are separately demodulated at the PMD sublayer at the receive end to obtain n pieces of data, and then the n pieces of data are sent to a PMA sublayer. A process of adapting the n pieces of data to the N virtual channels at the PMA sublayer is as follows: the n pieces of data are converted into m pieces of data, and then the m pieces of data are demultiplexed to the N virtual channels. For a specific process of converting the n pieces of data into the m pieces of data, and demultiplexing the m pieces of data to the N virtual channels, refer to related processing in existing 40G Ethernet and 100G Ethernet.

Step S202: Extract FEC frames one by one from the data adapted to the N virtual channels.

Because FEC frames are all successively distributed to each virtual channel at the transmit end, when the FEC frames are extracted in this step, all the data adapted to the N virtual channels is considered as a whole, that is, only when data temporarily stored for the N virtual channels jointly is exactly data of one complete FEC frame, the FEC frame can be extracted from the data temporarily stored for the N virtual channels jointly. At the transmit end in the existing 40G Ethernet and 100G Ethernet, an FEC frame can be restored only when data temporarily stored by each virtual channel is data of one complete FEC frame, and the FEC frame is not restored when data temporarily stored for the virtual channels jointly is one FEC frame.

Step S203: Perform FEC decoding on the FEC frames, delete check bits from the FEC frames, and restore serial data code blocks.

It can be learned from the foregoing embodiment that an FEC frame includes X consecutive data bits and Y check bits that are generated when FEC coding is performed on the X consecutive data bits.

In this step, FEC decoding is a reverse process of FEC coding at the transmit end. The X data bits are checked based on the Y check bits in each FEC frame. After the check is completed, the Y check bits are deleted, and the serial data code blocks are restored. The restored serial data code blocks may be sent to a reconciliation sublayer for further processing.

In this embodiment, it can be learned that when FEC frames are restored, one FEC frame may be extracted as long as data of one complete FEC frame is temporarily stored for the N virtual channels jointly, and there is small latency. In addition, because space in which check information is filled is not obtained by compressing code blocks, but the space in which check information is filled is provided by directly inserting check bits, a quantity of check bits may be adjusted according to different scenario requirements, thereby meeting different FEC coding gain requirements of different scenarios and achieving high flexibility.

In another embodiment, N is specifically a least common multiple of m and n, m is a quantity of electrical channels, at an Ethernet physical layer, connected to two adjacent physical medium attachment sublayers, and n is a quantity of optical channels at the Ethernet physical layer.

In another embodiment, step S202 specifically includes:
performing block synchronization processing on the data adapted to the N virtual channels, so as to obtain N pieces of data whose blocks are synchronized;
locking an alignment word included in each piece of data whose blocks are synchronized;
performing, based on the locked alignment word, alignment and rearrangement processing on the N pieces of data whose blocks are synchronized; and
determining a boundary of each of the FEC frames based on the locked alignment word, and then extracting the FEC frames one by one from the N pieces of data whose blocks are synchronized and that undergo alignment and rearrangement processing.

Block synchronization processing, alignment word locking, and alignment and rearrangement processing mentioned above are the prior art. For details, refer to related processing in the existing 40G Ethernet and 100G Ethernet.

For a better understanding of the present invention, the following uses 400G Ethernet (a type of beyond-100G Ethernet) as an example to describe the present invention in detail separately from two perspectives of a transmit end and a receive end. For an architecture of the 400G Ethernet, still refer to FIG. 1.

On the one hand, the following processing is performed at the transmit end of the Ethernet:

At a reconciliation sublayer, 400 Gbit/s serial data from a MAC layer is converted into parallel data streams that match a CDGMII, and then the parallel data is sent to a PCS by using the CDGMII.

Referring to 7, the following processing is performed at the PCS sublayer on the data transmitted by using the CDGMII:

Step S401: Use 64B/66B codes to perform coding on a data stream transmitted by using an MII, so as to obtain serial 66B code blocks. The 64B/66B codes used herein may be replaced by 256B/257B codes, or other codes.

Figure 8:
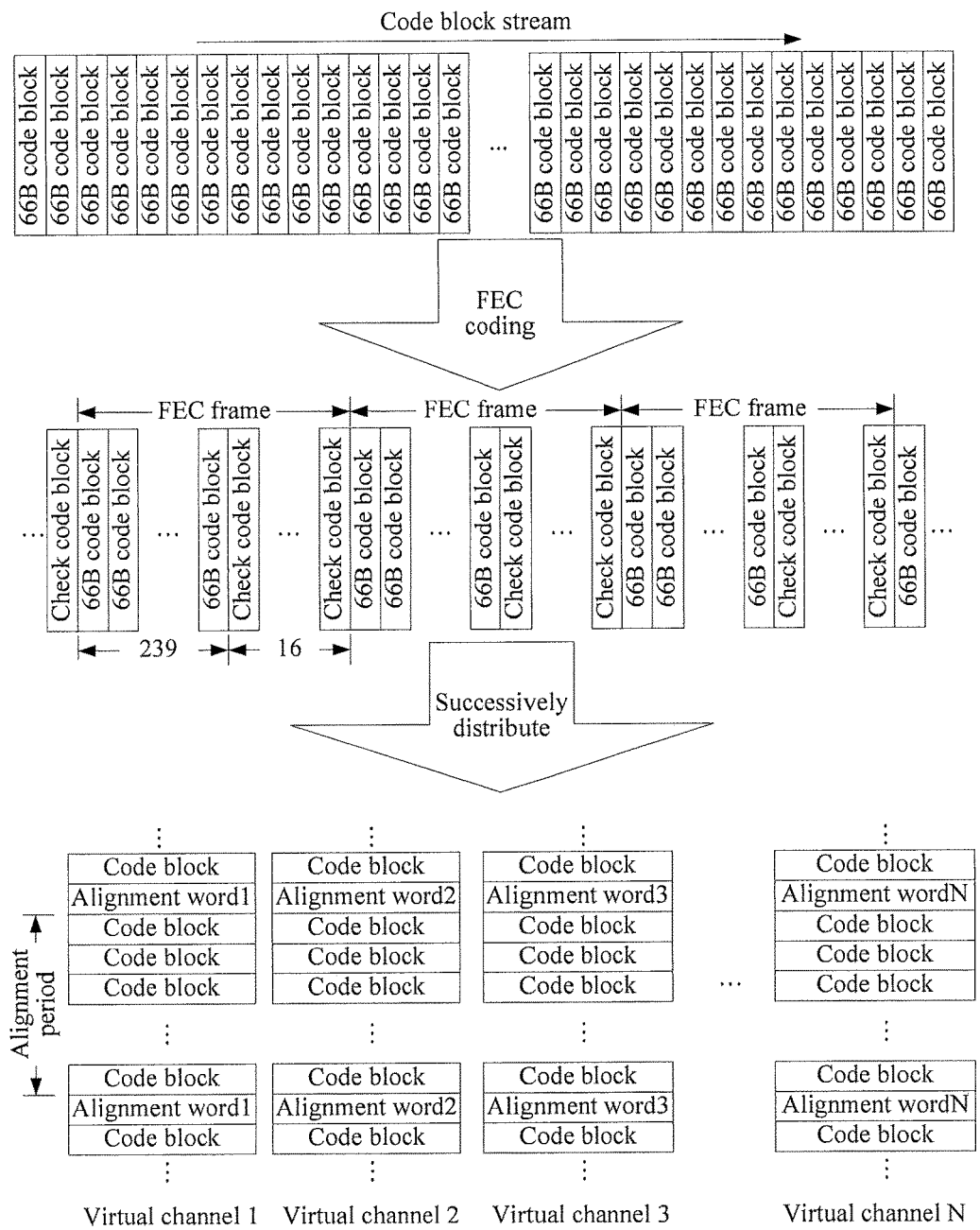
FIG. 8 is a schematic diagram of FEC coding and successive distribution according to an embodiment of the present invention.

Step S402: Perform FEC coding on the serial 66B code blocks. Referring to FIG. 8, this step is specifically: FEC coding is performed on X consecutive data bits and Y check bits are generated; one FEC frame includes the X consecutive data bits and the Y check bits. In a specific implementation scheme, X is 15774 and Y is 1056. That is, 16 66B check code blocks are generated when FEC coding is performed on 239 66B code blocks, and one FEC frame includes the 239 66B code blocks and the 16 check code blocks. The serial 66B code blocks form a series of FEC frames after FEC coding.

Step S403: Perform scrambling processing on the FEC frames. Scrambling processing may enable the receive end to restore a clock signal from received data more easily. In this step, a scrambling polynomial $1+b^{38}+b^{47}$ may be used to perform scrambling processing. Certainly, another scrambling polynomial may be used, which is not limited in this application.

Step S404: Successively distribute FEC frames after scrambling processing to N virtual channels.

In this step, the FEC frames after scrambling processing may be distributed, at a distribution granularity of 66B code blocks, successively to the N virtual channels. Referring to FIG. 8, a successive distribution process is: The first 66B code block of the first FEC frame after scrambling processing is distributed to a virtual channel 1, the second 66B code block is distributed to a virtual channel 2, . . . the Nth 66B code block is distributed to a virtual channel N, the (N+1)th 66B code block is distributed to the virtual channel 1, and so on, until the last 66B code block of the first FEC frame is distributed to a corresponding virtual channel. A method used to distribute each subsequent FEC frame to the N virtual channels is the same as a method used to distribute the first FEC frame to the N virtual channels. The only difference is that a virtual channel to which the first 66B code block of each subsequent FEC frame is distributed is a next virtual channel of a virtual channel to which the last 66B code block of a previous FEC frame is distributed, where a next virtual channel of the virtual channel N is the virtual channel 1. The distribution granularity may be the 66B code blocks, or may be 20 bits. The distribution granularity is not limited in this application.

To adapt to a quantity of electrical channels that form an AUI in 400G Ethernet and a quantity of optical channels at an Ethernet physical layer of the 400G Ethernet, a value of N is set to a least common multiple of the quantity m of electrical channels that form an AUI and the quantity n of optical channels at the Ethernet physical layer of the 400G Ethernet.

Step S405: Periodically insert an alignment word into each virtual channel.

Referring to FIG. 8, in this step, an alignment period of the alignment word inserted into each virtual channel may be $(Q \times (X+Y))/(N \times 66)$ 66B code blocks. This step is specifically: One alignment word is inserted into each virtual channel every $(Q \times (X+Y))/(N \times 66)$ 66B code blocks, where a value of Q enables data of Q FEC frames to be exactly distributed evenly to the N virtual channels. Because the FEC frames are distributed, at the distribution granularity of 66B code blocks, successively to the N virtual channels, when $(Q \times (X+Y))/(N \times 66)$ 66B code blocks are distributed to any virtual channel, $(Q \times (X+Y))/(N \times 66)$ 66B code blocks are also distributed to each of the other N−1 virtual channels. In other words, a total quantity of 66B code blocks that are distributed to the N virtual channels within one alignment period is $Q \times (X+Y)/66$, that is, Q FEC frames are successively distributed to the N virtual channels within one alignment period. After the Q FEC frames are distributed, at the distribution granularity of 66B code blocks, successively to the N virtual channels, exactly one alignment word can be inserted into each virtual channel. Preferably, a size of the alignment word is the same as a size of the distribution granularity, that is, 66 bits.

In this step, an alignment word is inserted into each virtual channel, so that the receive end can eliminate a latency deviation between the N virtual channels according to the alignment word in each virtual channel. In addition, the receive end can determine a boundary of one FEC frame according to the alignment word in each virtual channel.

If the distribution granularity is a 20-bit data block in step S404, at least one alignment word is inserted every $(Q \times (X+Y))/(N \times 20)$ of the distribution granularity in this step.

At a first PMA sublayer, the data in the N virtual channels is converted into m pieces of data.

In a case in which N is equal to m, the data from the N virtual channels is directly transmitted to a second PMA sublayer separately over the m electrical channels that form the AUI.

In a case in which N is not equal to m, data from N/m virtual channels is multiplexed into one piece of data by means of bit multiplexing or code block multiplexing, so as to obtain the m piece of data. Then, the m pieces of data are separately transmitted to the second PMA sublayer over the m electrical channels that form the AUI. Code block multiplexing and bit multiplexing are similar, and the only difference is: Bit multiplexing is performed on a bit basis, while code block multiplexing is performed on a code block basis.

At the second PMA sublayer, one of the following two manners is used to convert the m pieces of data into n pieces of data, where the m pieces of data are transmitted over the m electrical channels that form the AUI:

Manner 1: Distribute, by bits, the m pieces of data into the n pieces of data in polling mode.

Manner 2: Distribute, by code blocks, the m pieces of data into the n pieces of data in polling mode.

For the manner 1, refer to related processing in the existing 100G Ethernet. The manner 2 differs from the manner 1 only in that polling distribution is performed by code blocks. Details are not described herein again.

At a PMD sublayer, the n pieces of data from the second PMA sublayer are separately modulated onto n optical carriers, so as to obtain n optical signals. The n optical signals are transmitted to the receive end of the 400G Ethernet over n optical channels.

On the other hand, the following processing is performed at the receive end of the Ethernet:

At the PMD sublayer, the n optical signals transmitted over the n optical channels are demodulated, so as to obtain the n pieces of data, and then the n pieces of data are sent to the second PMA sublayer.

At the second PMA sublayer, the n pieces of data from the PMD sublayer are converted into the m pieces of data, and the m pieces of data are transmitted to the first PMA sublayer over the m electrical channels that form the AUI.

At the first PMA sublayer, the m pieces of data transmitted over the m electrical channels that form the AUI are demultiplexed to the N virtual channels. It may be learned from descriptions of the foregoing embodiment that the FEC frames are all successively distributed to the N virtual channels at the transmit end, that is, data distributed to each virtual channel includes a part of a same FEC frame. Accordingly, the data is demultiplexed to the N virtual channels at the receive end. The data in each virtual channel definitely includes a part of a same FEC frame.

Processing performed at the first PMA sublayer and processing performed at the second PMA sublayer at the receive end are respectively reverse to processing performed at the first PMA sublayer and processing performed at the second PMA sublayer at the receive end.

Figure 9:
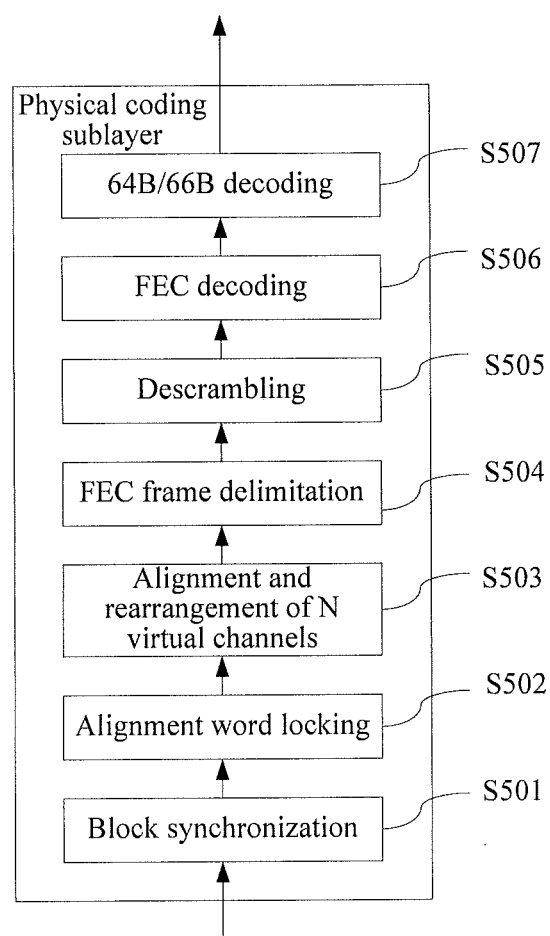
FIG. 9 is a flowchart of an Ethernet data processing method according to still another embodiment of the present invention.

Referring to FIG. 9, the following processing is performed, at the PCS, on the data from the N virtual channels of the first PMA sublayer:

Step S501: Perform block synchronization processing on the data adapted to the N virtual channels, so as to obtain N pieces of data whose blocks are synchronized.

Step S502: Lock an alignment word included in each piece of data whose blocks are synchronized.

Step S503: Perform, based on the locked alignment word, alignment and rearrangement processing on the N pieces of data whose blocks are synchronized.

Step S504: Determine a boundary of each of the FEC frames based on the locked alignment word, and then extract the FEC frames one by one from the N pieces of data whose blocks are synchronized and that undergo alignment and rearrangement processing. In this embodiment, because the data in each virtual channel includes a part of a same FEC frame, when an FEC frame is extracted, data adapted to the N virtual channels is considered as a whole. When data temporarily stored for the N virtual channels jointly is exactly one complete FEC frame, the FEC frame is extracted. Therefore, the FEC frames are extracted one by one in this embodiment of the present invention.

Step S505: Perform descrambling processing on the extracted FEC frames.

Step S506: Perform FEC decoding on the descrambled FEC frames, and delete check bits from each of the FEC frames, so as to obtain serial 66B code blocks.

Step S507: Perform 64B/66B decoding on the serial 66B code blocks, and then send, by using a CDGMII, data obtained by decoding to a reconciliation sublayer.

For a specific process of steps S501 to S503, refer to related processing in the existing 100G Ethernet. The steps S505, S506, and S507 are respectively reverse processing of the steps S403, S402, and S401, which is not described herein again.

Figure 10:
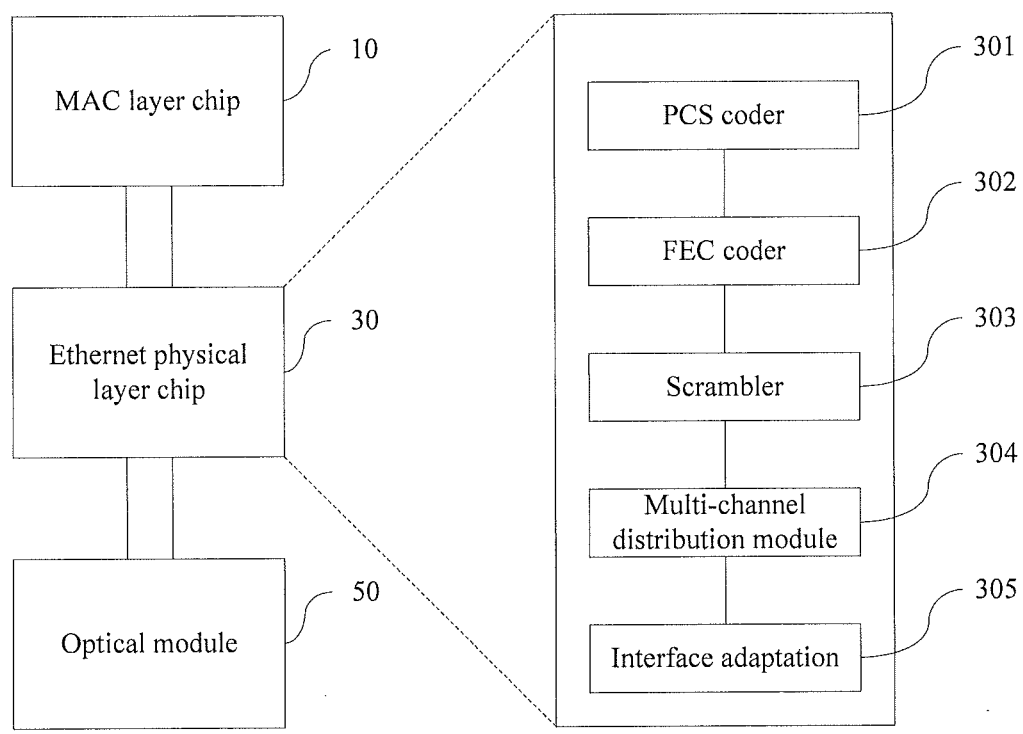
FIG. 10 is a schematic diagram of a structure of Ethernet equipment according to an embodiment of the present invention.

An embodiment of the present invention further provides Ethernet equipment. As shown in FIG. 10, a structure of the Ethernet equipment includes: a MAC chip 10, an Ethernet physical layer chip 30, an optical module 50, and an AUI that includes m electrical channels and connects the Ethernet physical layer chip 30 and the optical module 50.

The Ethernet physical layer chip 30 is configured to: perform line coding on data from the MAC chip 10, so as to obtain serial data code blocks; perform FEC coding on the serial data code blocks, so as to obtain FEC frames; distribute, at a distribution granularity of a bits, the FEC frames successively to N virtual channels; and transmit data from the N virtual channels to the optical module 50 over the m electrical channels that form the AUI connecting the Ethernet physical layer chip 30 and the optical module 50.

The optical module 50 is configured to: convert the data input over the m electrical channels into n pieces of data; separately modulate the n pieces of data onto n optical carriers, so as to obtain n optically modulated signals; and transmit the n optically modulated signals to n optical channels.

N, m, n, and a are all positive integers, and a is less than a quantity of bits included in one FEC frame. Preferably, N is specifically a least common multiple of m and n; a is specifically equal to a quantity of bits included in the data code blocks, or a is specifically equal to a quantity of bits included in a code symbol of FEC coding.

An embodiment of the present invention further provides an Ethernet physical layer chip 30. As shown in FIG. 10, a structure of the Ethernet physical layer chip 30 includes: a PCS coder 301, an FEC encoder 302, and a multi-channel distribution module 304.

The PCS coder 301 is configured to perform line coding on data from a media access control layer, so as to obtain serial data code blocks. The PCS coder 301 may be specifically a 64B/66B coder, a 256B/257B coder, or a 512B/513B coder, or may be another coder, which is not limited in the present invention.

The FEC encoder 302 is configured to perform FEC coding on the serial data code blocks that are obtained by the PCS coder 301, so as to obtain FEC frames. Each of the FEC frames includes X consecutive data bits and Y check bits that are generated when FEC coding is performed on the X consecutive data bits, where X and Y are both positive integers.

The multi-channel distribution module 304 is configured to distribute, at a distribution granularity of a bits, the FEC frames successively to N virtual channels. For a process in which the multi-channel distribution module 304 distributes, at the distribution granularity of a bits, the FEC frames successively to the N virtual channels, refer to related descriptions in the foregoing method embodiments. Details are not described herein again.

a is less than a quantity of bits included in one FEC frame. Preferably, a may be specifically equal to a quantity of bits included in the data code blocks, or a may be specifically equal to a quantity of bits included in a code symbol of FEC coding.

In this embodiment, when performing FEC coding, the FEC encoder 302 directly inserts check bits to provide space in which check information generated during FEC coding is filled, instead of compressing a synchronization header of a data code block to provide space in which check information generated during FEC coding is filled. Therefore, this embodiment of the present invention can provide a higher FEC coding gain, and a quantity of check bits may be changed according to different scenarios to provide different FEC coding gains and meet different gain requirements. In addition, in this embodiment of the present invention, FEC coding is first performed by using an FEC encoder, and then FEC frames obtained by FEC coding are successively distributed to N virtual channels. In this manner, FEC decoding can be performed as long as data temporarily stored for the N virtual channels jointly at a receive end is exactly one complete FEC frame. Therefore, latency is greatly decreased.

In one embodiment, the Ethernet physical layer chip 30 may further include a scrambler 303, which is configured to perform scrambling processing on the FEC frames that are output by the FEC encoder. Accordingly, the multi-channel distribution module specifically distributes the FEC frames after scrambling processing successively to the N virtual channels. Specifically, the scrambler 303 may use a scrambling polynomial $1+b^{38}+b^{47}$ to perform scrambling processing, or may use another scrambling polynomial, which is not limited in the present invention.

In one specific embodiment, the multi-channel distribution module distributes, at a distribution granularity of a bits, the FEC frames successively to the N virtual channels on a basis of Q FEC frames, and inserts, every $(Q \times (X+Y))/(N \times a)$ of the preset distribution granularity, one alignment word into each virtual channel, where a value of Q enables data of the Q FEC frames to be evenly distributed to the N virtual channels.

In one embodiment, the Ethernet physical layer chip 30 may further include an interface adaptation module, which is configured to convert data from the N virtual channels into m pieces of data. The interface adaptation module is specifically configured to: when N is not equal to m, multiplex data from N/m virtual channels into one piece of data by means of bit multiplexing or code block multiplexing.

Figure 11:
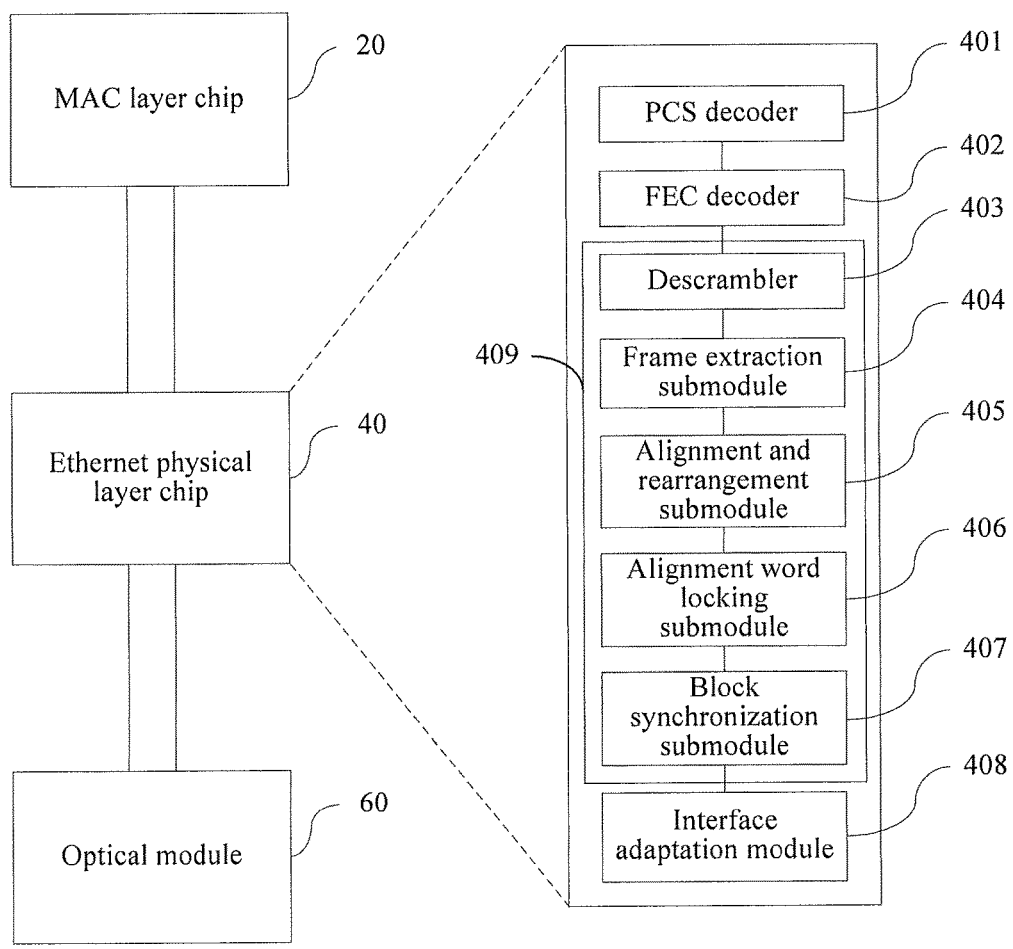
FIG. 11 is a schematic diagram of a structure of Ethernet equipment according to another embodiment of the present invention.

Corresponding to the Ethernet equipment provided by the foregoing embodiment, an embodiment of the present invention further provides another Ethernet equipment, which is configured to receive the n modulated optical signals sent by the Ethernet equipment provided by the foregoing embodiment and perform corresponding processing to restore MAC layer data sent by a transmit end. As shown in FIG. 11, a structure of the Ethernet equipment includes: a MAC chip 20, an Ethernet physical layer chip 40, an optical module 60, and an AUI that includes m electrical channels and connects the Ethernet physical layer chip 40 and the optical module 60.

The optical module 60 is configured to: receive n optical signals transmitted over n optical channels; demodulate the n optical signals, so as to obtain n pieces of data; convert the n pieces of data into m pieces of data; and transmit the m pieces of data to the Ethernet physical layer chip over the m electrical channels.

The Ethernet physical layer chip 40 is configured to: receive the m pieces of data transmitted over the m electrical channels; adapt the m pieces of data to N virtual channels; extract FEC frames one by one from the data adapted to the N virtual channels; perform FEC decoding on the FEC frames, delete check bits from the FEC frames, and restore serial data code blocks; perform line decoding on the serial data code blocks, and transmit decoded data to the MAC chip 20. The FEC frame includes X data bits and Y check bits that are generated when FEC coding is performed on the X data bits, data adapted to each virtual channel includes a part of a same FEC frame, and X and Y are positive integers.

In this embodiment, when the FEC frames are extracted one by one, the data adapted to the N virtual channels is considered as a whole. When the data adapted to the N virtual channels exactly forms one complete FEC frame, the FEC frame can be extracted; while in the prior art, only when the data adapted to each virtual channel includes data of one complete FEC frame, the FEC frame can be extracted.

In this embodiment, m and n are both positive integers. Preferably, N is specifically a least common multiple of m and n.

In this embodiment, when FEC frames are extracted, one FEC frame may be extracted as long as data adapted to N virtual channels can jointly form the FEC frame, and there is small latency. In addition, because space in which check information is filled is not obtained by compressing code blocks, but the space in which check information is filled is provided by directly inserting check bits, this embodiment of the present invention can provide a higher FEC coding gain. In addition, a quantity of check code blocks may be adjusted according to requirements, thereby meeting different FEC coding gain requirements of different scenarios and achieving high flexibility.

An embodiment of the present invention further includes an Ethernet physical layer chip 40. As shown in FIG. 11, a structure of the Ethernet physical layer chip 40 includes: a decoder 401, an FEC decoder 402, an FEC frame restoration module 409, and an interface adaptation module 408.

The interface adaptation module 408 is configured to adapt m pieces of data transmitted over m electrical channels to N virtual channels. Data adapted to each virtual channel includes a part of a same FEC frame. Each FEC frame includes X consecutive data bits and Y check bits that are generated when FEC coding is performed on the X consecutive data bits.

The FEC frame restoration module 409 is configured to extract FEC frames one by one from the data adapted to the N virtual channels.

The FEC decoder 402 is configured to perform FEC decoding on the extracted FEC frames, delete check bits from each of the FEC frames, and restore serial data code blocks.

In this embodiment of the present invention, X, Y, N, m, and n are all positive integers. Preferably, N is a least common multiple of m and n, and m is a quantity of electrical channels, at an Ethernet physical layer, connected to two adjacent physical medium attachment sublayers.

In this embodiment, it can be learned that, when FEC frames are restored, one FEC frame may be extracted as long as data of one complete FEC frame is temporarily stored for N virtual channels jointly, and there is small latency. In addition, because space in which check information is filled is not obtained by compressing code blocks, but the space in which check information is filled is provided by directly inserting check bits, a quantity of check bits may be accordingly adjusted according to different scenario requirements, thereby meeting different FEC coding gain requirements of different scenarios and achieving high flexibility.

In one embodiment, the FEC frame restoration module 409 specifically includes:

a block synchronization submodule 407, configured to perform block synchronization processing on the data adapted to the N virtual channels, so as to obtain N pieces of data whose blocks are synchronized;

an alignment word locking submodule 406, configured to lock an alignment word included in each piece of data whose blocks are synchronized;

an alignment and rearrangement submodule 405, configured to perform, based on the locked alignment word, rearrangement and alignment processing on the N pieces of data whose blocks are synchronized; and a frame extraction submodule 404, configured to determine a boundary of each FEC frame based on the locked alignment word, and then extract the FEC frames one by one from the N pieces of data whose blocks are synchronized and that undergo rearrangement and alignment processing.

In one embodiment, the FEC frame restoration module 409 may further include a descrambler 403, configured to perform descrambling processing on the extracted FEC frames.

In one embodiment, the Ethernet physical layer chip 40 may further include:

a PCS decoder 402, configured to perform line decoding on the restored serial data code blocks, and then send data obtained by line decoding to the MAC chip 20. Line decoding performed by the PCS decoder 402 is reverse processing of line coding performed by the PCS coder 301 at a transmit end.

Figure 12:
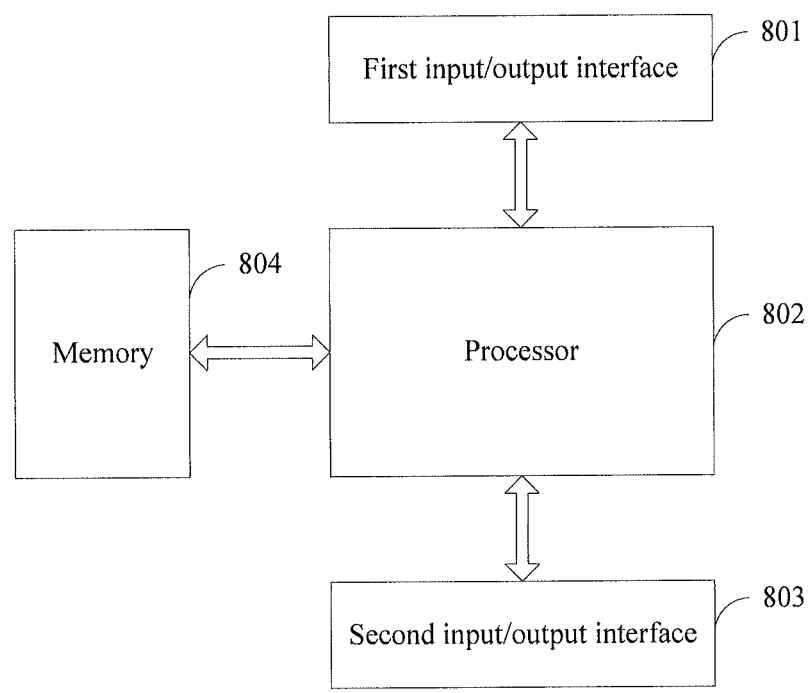
FIG. 12 is a schematic diagram of a structure of an Ethernet physical layer chip according to another embodiment of the present invention.

An embodiment of the present invention further provides an Ethernet physical layer chip. As shown in FIG. 12, a structure of the Ethernet physical layer chip includes: a first input/output interface 801, a processor 802, a second input/output interface 803, and a memory 804.

In a sending direction:

The first input/output interface 801 is configured to receive data from an Ethernet MAC layer, and input the data to the processor 802.

The processor 802 is configured to: perform line coding on data from a MAC chip, so as to obtain serial data code blocks; perform FEC coding on the serial data code blocks, so as to obtain FEC frames, which specifically includes: inserting Y check bits every X consecutive data bits, where the Y check bits are generated when FEC coding is performed on the X consecutive data bits; and distribute, at a distribution granularity of a bits, the FEC frames successively to N virtual channels; where each of the FEC frames includes the X consecutive data bits and the Y check bits that are generated when FEC coding is performed on the X consecutive data bits, X, Y, N, and a are all positive integers, and a is less than a quantity of bits included in one FEC frame.

In one specific embodiment, preferably, N is specifically a least common multiple of m and n, m is a quantity of electrical channels, at an Ethernet physical layer, connected to two adjacent physical medium attachment sublayers, and n is a quantity of optical channels at the Ethernet physical layer.

The second input/output interface 803 is configured to send data of the N virtual channels to a PMD sublayer.

In a receiving direction:

The second input/output interface 803 is configured to receive data from the PMD sublayer, and input the data to the processor 802.

The processor 802 is configured to: adapt the data input by the second input/output interface 803 to the N virtual channels; extract FEC frames one by one from the data adapted to the N virtual channels; perform FEC decoding on the extracted FEC frames, and delete check bits from each of the FEC frames, so as to obtain serial data code blocks; and perform line decoding on the serial data code blocks.

The first input/output interface 801 is configured to send data obtained by means of line decoding by the processor 802 to the MAC layer.

The memory 804 is configured to store a program required when the processor 804 performs processing in the sending direction and the receiving direction, and store data that needs to be temporarily stored when the processor 804 performs processing in the sending direction and the receiving direction.

In another embodiment, in the sending direction, the processor 802 is further configured to: before distributing the FEC frames successively to the N virtual channels, perform scrambling processing on the FEC frames. Accordingly, the processor is specifically configured to distribute, at the distribution granularity of a bits, the FEC frames after scrambling processing successively to the N virtual channels, where a is a positive integer and is less than a quantity of bits included in each of the FEC frames. That the processor 802 distributes the FEC frames, regardless of being scrambled or unscrambled, successively to the N virtual channels may specifically be: distributing, at a distribution granularity of a bits, Q FEC frames successively to the N virtual channels, where a value of Q enables data of the Q FEC frames to be evenly distributed to the N virtual channels. The processor may further be configured to: before the data from the N virtual channels is output from the second input/output interface, insert, every $((Q \times (X+Y))/(N \times a))$ of the distribution granularity, at least one alignment word into each virtual channel.

In the receiving direction, that the processor 802 extracts the FEC frames one by one from the data adapted to the N virtual channels specifically includes:

performing block synchronization processing on the data adapted to the N virtual channels, so as to obtain N pieces of data whose blocks are synchronized;

locking an alignment word included in each piece of data whose blocks are synchronized;

performing, based on the locked alignment word, alignment and rearrangement processing on the N pieces of data whose blocks are synchronized; and determining a boundary of an FEC frame based on the locked alignment word, and then identifying the FEC frames that need to be extracted one by one from the N pieces of data whose blocks are synchronized and that undergo alignment and rearrangement processing.

In this embodiment, when performing FEC coding, the processor 802 directly inserts check bits to provide space in which check information generated during FEC coding is filled, but does not compress a synchronization header of a data code block to provide space in which check information generated during FEC coding is filled. Therefore, this embodiment of the present invention can provide a higher FEC coding gain, and a quantity of check bits may be changed according to different scenarios to provide different FEC coding gains and meet different gain requirements. In addition, in this embodiment of the present invention, FEC coding is first performed, and then FEC frames obtained by FEC coding are successively distributed to N virtual channels. In this manner, FEC decoding can be performed as long as data temporarily stored for the N virtual channels jointly at a receive end is exactly one complete FEC frame. Therefore, latency is greatly decreased.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing device, chip, and unit, reference may be made to a corresponding process in the foregoing method embodiments, and details are not described herein again.

In the several embodiments provided in the present application, it should be understood that the disclosed device, chip and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The modules described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional modules in the embodiments of the present invention may be integrated into one processing unit, or each of the modules may exist alone physically, or two or more modules are integrated into one module.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An Ethernet data processing method, comprising:
   performing line coding on data from a media access control layer, by a first optical transceiver, so as to obtain serial data code blocks;
   performing Forward Error Correction FEC coding on the serial data code blocks, by the first optical transceiver, so as to obtain FEC frames, which comprises: inserting Y check bits every X consecutive data bits, wherein the Y check bits are generated when FEC coding is performed on the X consecutive data bits, and each of the FEC frames comprises the X consecutive data bits and the Y check bits that are generated when FEC coding is performed on the X consecutive data bits, wherein X and Y are both positive integers;
   performing, by the first optical transceiver, scrambling processing on the FEC frames to improve a restoration of a clock signal from the FEC frames;
   distributing, by the first optical transceiver, at a distribution granularity of A bits, the scrambled FEC frames successively to N virtual channels, wherein A and N are both positive integers, and A is less than a quantity of bits comprised in each of the FEC frames;
   converting, by the first optical transceiver, electrical data from the N virtual channels into m pieces of electrical data, and transmitting the m pieces of electrical data over m electrical channels;
   distributing, by the first optical transceiver, the m pieces of electrical data from the m electrical channels into n pieces of electrical data in polling mode;
   modulating, by the first optical transceiver, the n pieces of electrical data onto n optical carriers to obtain n optical signals; and
   transmitting, by the first optical transceiver, the n optical signals to a second optical transceiver over the n optical channels,
   wherein
   N is a least common multiple of m and n, m is a quantity of electrical channels, at an Ethernet physical layer, connected to two adjacent physical medium attachment sublayers, and n is a quantity of optical channels at the Ethernet physical layer.

2. The Ethernet data processing method according to claim 1, wherein each of the FEC frames further comprises at least one FEC frame identifier field used for indicating a location of a Y check bit of the Y check bits in the FEC frames.

3. The Ethernet data processing method according to claim 1, the distributing, at a distribution granularity of A bits, the FEC frames successively to N virtual channels comprises:
   distributing, at the distribution granularity of A bits, Q FEC frames of the scrambled FEC frames successively to the N virtual channels; and
   inserting, every $(Q \times (X+Y))/(N \times A)$ of the distribution granularity of A bits, at least one alignment word into each virtual channel, wherein a value of Q enables data of the Q FEC frames to be evenly distributed to the N virtual channels, and the alignment word is used by a receive end to determine a boundary of an FEC frame,
   wherein Q is a positive integer.

4. The Ethernet data processing method according to claim 1, wherein A is equal to a positive integer multiple of a quantity of bits comprised in the serial data code blocks, or A is equal to a positive integer multiple of a quantity of bits comprised in a code symbol of FEC coding.

5. The Ethernet data processing method according to claim 1, wherein the converting data from the N virtual channels into m pieces of data comprises:
   if N is not equal to m, multiplexing data from N/m virtual channels into one piece of data by means of bit multiplexing or code block multiplexing.

6. An Ethernet data processing method, comprising:
   receiving, by a first optical transceiver, n optical signals from a second optical transceiver over n optical channels;
   demodulating, by the first optical transceiver, the n optical signals at a physical medium dependent sublayer to obtain n pieces of electrical data;
   adapting, by the optical transceiver, n pieces of data from the physical medium dependent sublayer to N virtual channels by converting the n pieces of electrical data into m pieces of electrical data and demultiplexing the m pieces of electrical data to the N virtual channels, wherein n and N are positive integers, and data adapted to each virtual channel comprises a part of a Forward Error Correction (FEC) frame;
   extracting, by the optical transceiver, FEC frames one by one from the data adapted to the N virtual channels, wherein each of the FEC frames comprises X consecutive data bits and Y check bits, the Y check bits are generated when FEC coding is performed on the X consecutive data bits, and X and Y are both positive integers;
   performing, by the optical transceiver, descrambling processing on the extracted FEC frames; and
   performing, by the optical transceiver, FEC decoding on the descrambled FEC frames, deleting check bits from the descrambled FEC frames, and restoring serial data code blocks,
   wherein N is a least common multiple of m and n, and m is a quantity of electrical channels, at an Ethernet physical layer, connected to two adjacent physical medium attachment sublayers, and n is a quantity of optical channels at the Ethernet physical layer.

7. The Ethernet data processing method according to claim 6, wherein the extracting FEC frames one by one from the data adapted to the N virtual channels comprises:
   performing block synchronization processing on the data adapted to the N virtual channels, so as to obtain Z pieces of data with synchronized blocks;
   locking an alignment word comprised in each piece of the Z pieces of data with synchronized blocks;
   performing, based on the locked alignment word, alignment and rearrangement processing on the Z pieces of data with synchronized blocks; and
   determining a boundary of each of the FEC frames based on the locked alignment word, and then extracting the FEC frames one by one from the Z pieces of data with synchronized blocks.

8. An Ethernet physical layer chip, comprising:
at least one memory configured to store at least one instruction; and
a first optical transceiver configured to:
perform line coding on data from a media access control layer, so as to obtain serial data code blocks,
perform FEC coding on the serial data code blocks, so as to obtain FEC frames, which comprises: inserting Y check bits every X consecutive data bits, wherein the Y check bits are generated when FEC coding is performed on the X consecutive data bits, and each of the FEC frames comprises the X consecutive data bits and the Y check bits that are generated when FEC coding is performed on the X consecutive data bits, wherein X and Y are both positive integers,
distribute, at a distribution granularity of A bits, Q FEC frames of the scrambled FEC frames successively to N virtual channels, and insert, every (Q×(X+Y))/(N×A) of the distribution granularity of A bits, at least one alignment word into each virtual channel, wherein a value of Q enables data of the Q FEC frames to be evenly distributed to the N virtual channels, and the alignment word is used by a receive end to determine a boundary of an FEC frame,
convert electrical data from the N virtual channels into m pieces of electrical data, and transmit the m pieces of electrical data over m electrical channels,
distribute the m pieces of electrical data from the m electrical channels into n pieces of electrical data in polling mode,
modulate the n pieces of electrical data onto n optical carriers to obtain n optical signals, and
transmit the n optical signals to a second optical transceiver over the n optical channels,
wherein Q is a positive integer, wherein A equals to the quantity of bits comprised in a code symbol of FEC coding, and
wherein N is a least common multiple of m and n, m is a quantity of electrical channels, at an Ethernet physical layer, connected to two adjacent physical medium attachment sublayers, and n is a quantity of optical channels at the Ethernet physical layer.

9. The Ethernet physical layer chip according to claim 8, wherein the first optical transceiver is further configured to: when N is not equal to m, multiplex data from N/m virtual channels into one piece of data by means of bit multiplexing or code block multiplexing.

10. An Ethernet physical layer chip, comprising:
at least one memory configured to store at least one instruction; and
a first optical transceiver configured to:
receive n optical signals from a second optical transceiver over n optical channels;
demodulate the n optical signals at a physical medium dependent sublayer to obtain n pieces of electrical data;
adapt n pieces of data from the physical medium dependent sublayer to N virtual channels by converting the n pieces of electrical data into m pieces of electrical data and demultiplexing the m pieces of electrical data to the N virtual channels, wherein n and N are positive integers, and data adapted to each virtual channel comprises a part of a Forward Error Correction (FEC) frame;
extract FEC frames one by one from the data adapted to the N virtual channels, wherein each of the FEC frames comprises X consecutive data bits and Y check bits, the Y check bits are generated when FEC coding is performed on the X consecutive data bits, and X and Y are both positive integers;
perform descrambling processing on the extracted FEC frames; and
perform FEC decoding on the descrambled FEC frames, delete check bits from the descrambled FEC frames, and restore serial data code blocks,
wherein N is a least common multiple of m and n, and m is a quantity of electrical channels, at an Ethernet physical layer, connected to two adjacent physical medium attachment sublayers.

11. The Ethernet physical layer chip according to claim 10, wherein the optical transceiver is further configured to:
perform block synchronization processing on the data adapted to the N virtual channels, so as to obtain Z pieces of data with synchronized blocks;
lock an alignment word comprised in each piece of the Z pieces of data with synchronized blocks;
perform, based on the locked alignment word, alignment and rearrangement processing on the Z pieces of data with synchronized blocks; and
determine a boundary of the FEC frame based on the locked alignment word, and then extract the FEC frames one by one from the Z pieces of data with synchronized blocks.

\* \* \* \* \*

UNITED STATES PATENT AND TRADEMARK OFFICE
CERTIFICATE OF CORRECTION

Page 1 of 1

PATENT NO. : 9,954,644 B2
APPLICATION NO. : 14/891778
DATED : April 24, 2018
INVENTOR(S) : Wei Su et al.

It is certified that error appears in the above-identified patent and that said Letters Patent is hereby corrected as shown below:

In the Claims

Column 24, Line 20, In Claim 6, delete "sublaver" and insert -- sublayer --, therefore.

Column 26, Line 31, In Claim 10, delete "laver" and insert -- layer --, therefore.

Signed and Sealed this
Nineteenth Day of June, 2018

Andrei Iancu
*Director of the United States Patent and Trademark Office*